Aug. 8, 1950 M. E. MOHR 2,517,587

SECRET MESSAGE TRANSMISSION SYSTEM

Filed Dec. 9, 1946 3 Sheets-Sheet 1

INVENTOR
M. E. MOHR
BY Harry C. Hart
ATTORNEY

SECRET MESSAGE TRANSMISSION SYSTEM

Filed Dec. 9, 1946 3 Sheets-Sheet 2

INVENTOR
M. E. MOHR
BY Harry C. Hart
ATTORNEY

INVENTOR
M. E. MOHR
BY Harry C. Hart
ATTORNEY

UNITED STATES PATENT OFFICE 2,517,587

SECRET MESSAGE TRANSMISSION SYSTEM

Milton E. Mohr, New Providence, N. J., assignor to Bell Telephone Laboratories, Incorporated, New York, N. Y., a corporation of New York Application December 9, 1946, Serial No. 715,071

20 Claims. (Cl. 179—1.5)

The present invention relates to systems and apparatus for establishing message signal current paths from each of a number of input leads or terminals to any one of a like number of output leads or terminals on a permutation basis. The circuits for performing this function are termed permuters.

While the invention is capable of general application it will be illustrated, by way of specific example, in connection with a secret message transmission system. In such a system it may be supposed that a message to be secretly transmitted is divided, on a frequency separation basis, a time division basis, or otherwise, into N parts which appear, one each, on N message leads. These N message parts are to reappear on N leads at the receiver end of the system, and are there to be reconstructed into a message. Between the transmitter and the receiver, however, the message is to appear in a form which is unintelligible to unauthorized persons.

Any type of transmission system may be visualized between the transmitter and the receiver, the simplest consisting, of course, of N physically separate conductors. Any suitable type of multiplex transmission can be used in practice but the N conductors will be assumed as physically present at the transmitter and again at the receiver.

If a permuter be inserted in these N conductors at the transmitter and an identical permuter be inserted similarly at the receiver and properly connected in circuit, secrecy in transmission can be obtained over the intervening transmission system, of whatever type, provided the permuters are so operated as to avoid any recognizable rule or scheme of interconnection of input leads to output leads. Ideally, a message portion entering on any input lead should have equal chances of appearing on any free output lead, regardless of the previous history of the interconnections. Tapping any one or all of the N transmission lines or channels will under these conditions give no clue to the particular input lead which is instantaneously supplying its signal to the transmission line tapped. Correct reproduction is achieved at the receiver, however, because the message paths there pass through the second permuter which is identical to the first in construction and mode of operation.

It is the general object of the invention to provide a high degree of secrecy in the transmission of messages from point to point. A more specific object is to provide for all possible permutations of the interconnections between a given group of input leads and a like group of output leads.

A permuter which attains these objects has already been proposed. It is described and claimed in an application of Harry Nyquist, Serial No. 592,968, filed May 10, 1945, now Patent No. 2,424,-998, Aug. 5, 1947. That system suffers the disadvantage that it includes a fairly large number of signal path-changing devices or "gates" in series with each message lead. This may be objectionable because each gate inevitably tends somewhat to distort the signal passing through it, so that an excessive number of series gates may result in degradation of the message quality and reduction in the fidelity of reproduction.

Accordingly, it is a specific object of the present invention to reduce, as far as possible, the number of gates in series in the message leads. This object is attained by the provision of a "coordinate switch" in which the N input leads may be visualized as N horizontal conductors and the N output leads as N vertical conductors crossing the horizontal conductors at $N^2$ cross-points. An enabling device is associated with each cross-point and an enabling lead with each enabling device. A novel translating network is provided, one part of which includes $N^2$ groups of impedance elements, of (N—1) ! (factorial N—1) elements each, all the elements of any one group being connected to one of the enabling leads, all those of the next group to the next enabling lead, and so on through $N^2$ groups and $N^2$ enabling leads. There are also provided N! (factorial N) actuating leads, each one connected to N of these impedance elements. Actuation of any one of these actuating leads then establishes a unique path from each input lead to an output lead. Actuation of another actuating lead establishes a different set of paths from input conductors to output conductors and successive actuation of all of them establishes the signal paths by all of the N! possible permutations, in succession.

The actuating leads are preferably supplied from a circuit comprised in another part of the translator network, which is energized by the joint operation of one of a first group of two key leads, one of a second group of three, and so on up to N. This second translating function and the circuit which accomplishes it make for ease and facility of operation, but they are not essential.

The other objects and the various features of the invention will be more clearly apprehended from the following detailed description of the illustrative embodiment shown in the attached drawings, in which.

Figure 2:
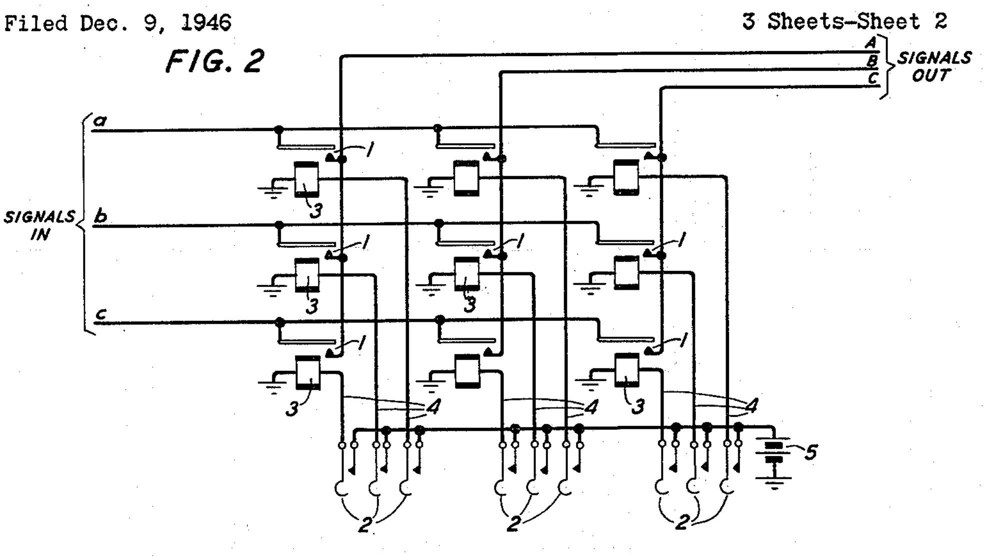
Fig. 2 is a schematic diagram illustrating certain of the principles of the invention.

Referring first to Fig. 2, a circuit is shown for establishing all possible signal paths from any one of three input leads *a*, *b*, or *c*, to any one of three output leads A, B, C. The output leads are indicated as crossing the input leads to form a grid of nine cross-points, each defined by one input lead and one output lead. In general, the grid formed of N input leads and N output leads will have $N^2$ cross-points.

Associated with each of the $N^2$ cross-points is an enabling device. Evidently the enabling devices, like the cross-points, are arranged (schematically) in rows, for the sake of illustration horizontal rows corresponding to input leads and vertical rows corresponding to output leads, though these associations are, of course, interchangeable. Whatever the physical arrangement of the apparatus, it is convenient to visualize it in this manner, as arranged in rows.

In the simplest possible form, each enabling device is a manual switch. More convenient for operation are relay-operated switches 1 as shown in the figure. Operating any one of the keys 2 closes a circuit through the winding of one of the relays 3 by way of the enabling leads 4 and the battery 5, which energizes the relay 3 and closes the enabling switch 1. The nine keys 2 are arranged in groups of three each, each group comprising all the keys of one and only one row (in the figure, one vertical row) of relays.

These nine (in general $N^2$) enabling devices may be operated three at a time in six (in general N! (factorial N)) different ways. Identifying each relay by the input lead and the output lead to which it is connected, these are

*a*A, *b*B, *c*C
*a*A, *b*C, *c*B
*a*B, *b*A, *c*C
*a*B, *b*C, *c*A
*a*C, *b*B, *c*A
*a*C, *b*A, *c*B

Each of these arrangements constitutes one permutation of the possible connections of the input leads to the output leads. With the arrangement of Fig. 2, they can be secured by simultaneously depressing one key 2 of each of the three groups.

The mechanical relays of Fig. 2 may be replaced by electronic devices, either vacuum tubes, gas discharge tubes, or the like. Any type of enabling device will serve which establishes a signal path from a particular input lead to a particular output lead, when actuated by a particular key signal. The particular type of enabling device which is preferred on account of its speed and simplicity is shown in Fig. 3, and will be described below.

Figure 1:
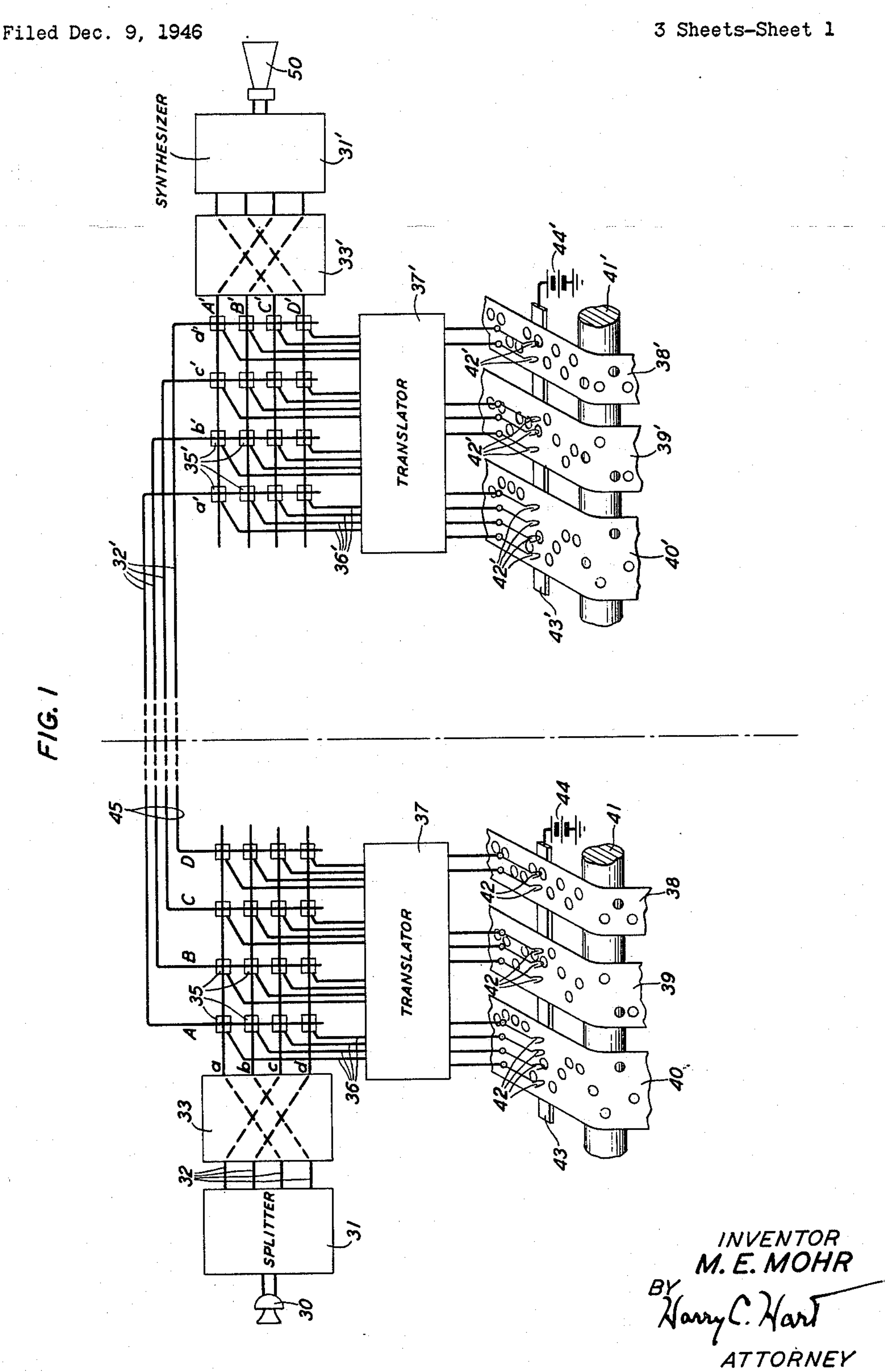
Fig. 1 shows in diagrammatic form a secret telephone system according to the invention.

The restriction which is placed on the arrangement of Fig. 2, namely, that, of the nine keys 2, three must be operated together, but not more than one of each group, is inconvenient in practice. To remove it, the translator circuit 7 of Fig. 3 is provided, by which any one of six (in general N!) individual actuating conductors 8 may be individually actuated, one at a time, to actuate the nine (in general $N^2$) enabling leads 4, three at a time, in N! different ways. Multiplicity of keys is further reduced by the circuit of the lower portion of the figure which produces individual actuation of the actuating leads 8, one at a time, by simultaneous operation of a two-way distributor 9 and a three-way distributor 10. These may be commutators, the first having three segments and the second two; or they may be electronic distributors of any convenient type, for example as described in W. H. T. Holden Patent 2,099,065; or they may be tape-operated devices as shown in Fig. 1 and described below. They may, indeed, take any convenient form.

Figure 3:
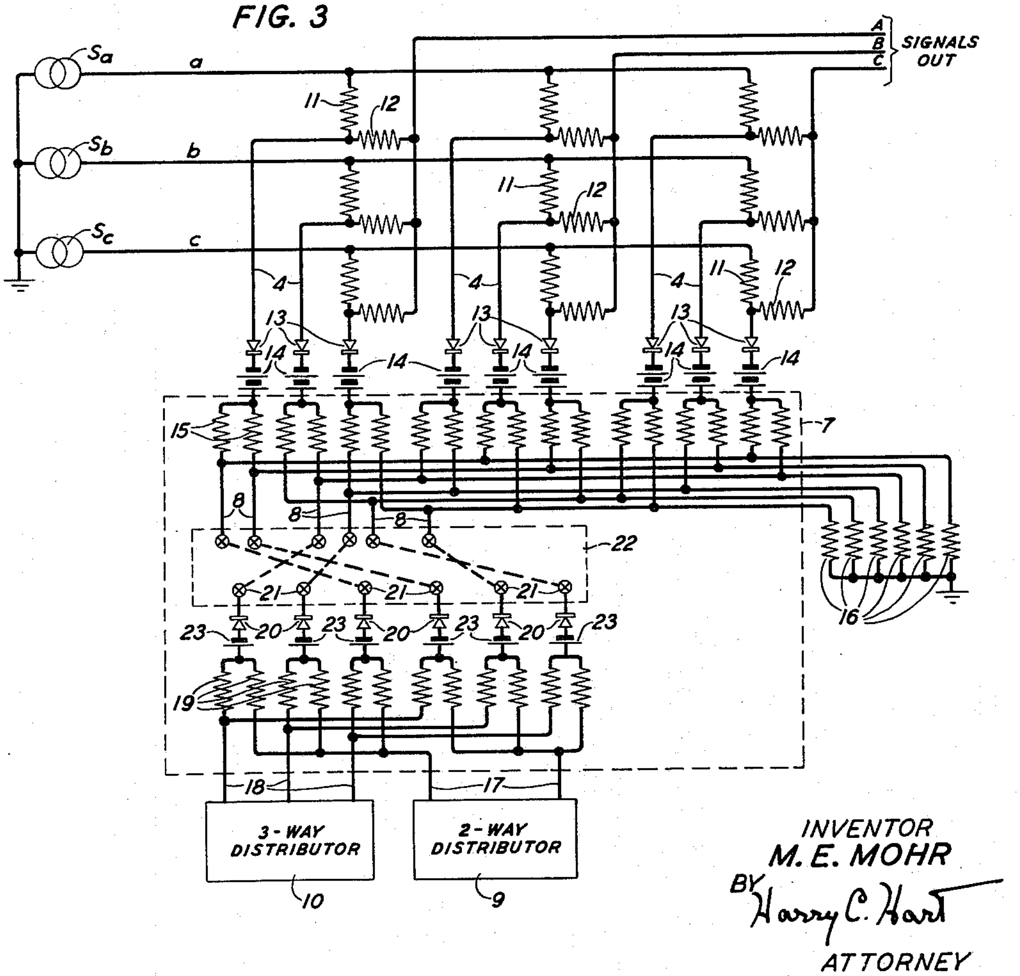
Fig. 3 is a circuit diagram of a 3x3 permuter according to the invention.

Each of the enabling devices of Fig. 3 comprises a pair of resistors 11, 12, one connected to an input lead and the other to an output lead, and a unidirectionally conducting device or rectifier 13 connected to their common terminal. A bias source is included at some point in the circuit, for example, the bias batteries 14 are provided so that in the absence of an actuating voltage each rectifier 13 is conductive, and any signal voltage, derived from any of the input signal sources S*a*, S*b*, S*c*, and appearing on an input lead, for example the *a* lead, is drained off by way of resistors 11, 15 and 16 to ground, no substantial part of it reaching any output lead. When however, an actuating voltage is applied, for example, to the left-hand actuating lead 8, which is of opposite polarity to and substantially in excess of the voltage of the bias battery 14, and of the voltage of the message signal source S*a*, the rectifier 13 becomes non-conductive and the signal voltage, instead of being drained away, is transferred by way of the two resistors 11, 12 in series from the input lead *a* to the output lead A. Each of the rectifiers 13 is connected, in the translator, by way of the bias battery 14 to two resistors 15, each of which is, in turn, connected to one of the six actuating leads 8. In general, there are (N—1)! resistors 15 connected to each of the $N^2$ enabling devices, and each of the actuating leads 8 is connected to a selected pattern of N out of the total number NxN! of these resistors. In particular, for N=3, each of the six (N!) actuating leads 8 is connected to three (N) of the eighteen (NxN!) resistors 15. Application of a voltage to any one of these six actuating leads 8 places substantially one half $$\left(\text{in general, } \frac{1}{N-1}\right)$$

of that voltage on each of three of the rectifiers 13. For example, application of the voltage to the left-hand actuating lead 8 places one-half of this voltage on the first rectifier of the left-hand group, on the second of the middle group and on the third of the right-hand group. The magnitude of the actuating voltage is to be selected so that the resulting rectifier voltage is sufficient to overcome the bias of the batteries 14 and any signal voltage and render the rectifiers 13 substantially non-conductive. This in turn, prevents the drain of signal energy and so establishes a signal current path from the three input leads *a*, *b*, *c*, to the three output leads A, B, C. The selections are different for each actuating lead to which the voltage is applied.

To facilitate operation in practice, this arrangement of six independent actuating voltages may be derived from two interdependent sources, operated together. The latter may be of the perforated impulse tape type, illustrated in Fig. 1, or it may be a set of distributors, mechanical or electronic. The number of distributors required is N—1. The lowest order distributor gives two values, the next three, and so on, up to N. In the example shown, where N=3, a two-value distributor 9 and a three-value distributor 10 suffice. For illustrative purposes, these may be visualized as commutators, one of two 180-degree segments and the other of three 120-degree segments. The brush wipers may be driven in any desired manner. When the signals to be permuted are ordinary voice or telegraph signals or the like, the distributors may be asynchronously driven, thus adding to the randomness of operation. The distributor drive may be modified to suit particular types of signals such, for example, as signals derived by a sampling process.

Whatever the details of the construction of the distributors 9, 10, their function is to apply actuating voltages to their various output leads 17, 18 two at a time, i. e., a voltage to one of the two leads of the group 17 simultaneously with a voltage to one of the three leads 18. These output leads may be connected in the manner shown by way of resistors 19 and rectifiers 20 to the six terminals 21. These may be connected directly, in one-to-one relation, to the actuating leads 8, or, if desired, a cross-connection panel 22 may be interposed. The rectifiers 20 are so biased, as by batteries 23, as to be normally non-conductive. The values of the resistors 19 and of the output voltages of the distributors 9, 10 are so chosen that when, and only when, the voltage is applied to both of the resistors 19 connected to a given rectifier 20, the bias is overcome, and the actuating voltage is applied by way of the cross-connection box 22 to the particular actuating lead 8 selected. One of the three output signals of the three-way distributor 10 and one of the two ouput signals of the two-way distribuor 9 may be taken together in six different ways; and each of these ways applies a voltage to both resistors 19 associated with one and only one of the terminals 21. Thus, by joint operation of the distributors 9, 10, message signal paths are established from the three input leads, *a*, *b*, *c*, to the three output leads A, B, C, in each of the six possible ways, tabulated above, and in random succession.

Figure 4:
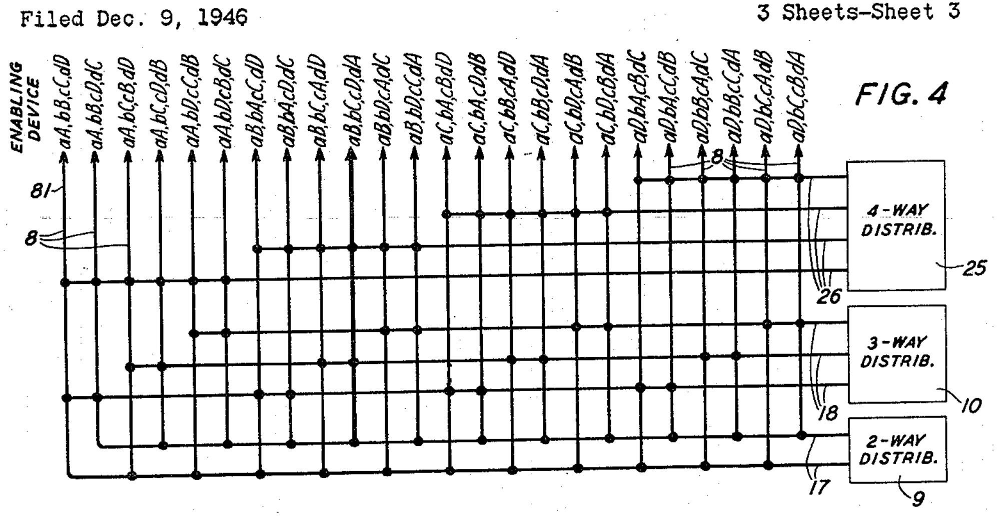
Fig. 4 is a partial circuit diagram of a 4x4 permuter according to the invention.

Fig. 4 shows some of the internal connections, and indicates others, of a permuter capable of establishing signal paths from four input leads to four output leads in all the possible ways, of which there are twenty-four (4!=2×3×4=24). The interconnections from the key leads 17, 18, 26 to the actuating leads 8 are indicated by dots at the intersections of these leads. A two-way distributor 9, a three-way distributor 10 and a four-way distributor 25 are provided. Connections from these distributors to the twenty-four actuating leads 8 are shown, resistors and rectifiers, which serve as described in connection with Fig. 3, being omitted from the drawing in the interests of clarity. Likewise, the connections from the actuating leads to the enabling devices are omitted. As in the case of Fig. 3, each enabling device may be connected, by way of a rectifier, to six (N—1)! resistors. Each of these ninety-six resistors is connected to only one of the actuating leads 8 while each actuating lead 8 is connected to four of the resistors. Thus the actuating lead 8 may be connected to one of the resistors which serves the enabling device *a*A, to one of those which serves the enabling device *b*B, to one of those which serves the enabling device *c*C, and to one of those which serves the enabling device *d*D. Application of a voltage to this actuating lead thus actuates the four enabling devices which lie along the principal diagonal of the grid formed of the input leads and the output leads, and so establishes signal paths from *a* to A, from *b* to B, from *c* to C, and from *d* to D.

For best operation, the resistance values of the elements 11, 12, of Fig. 3 should be several times as great as those of the elements 15. These, in turn, should be several times as great as those of the elements 19.

Figure 5:
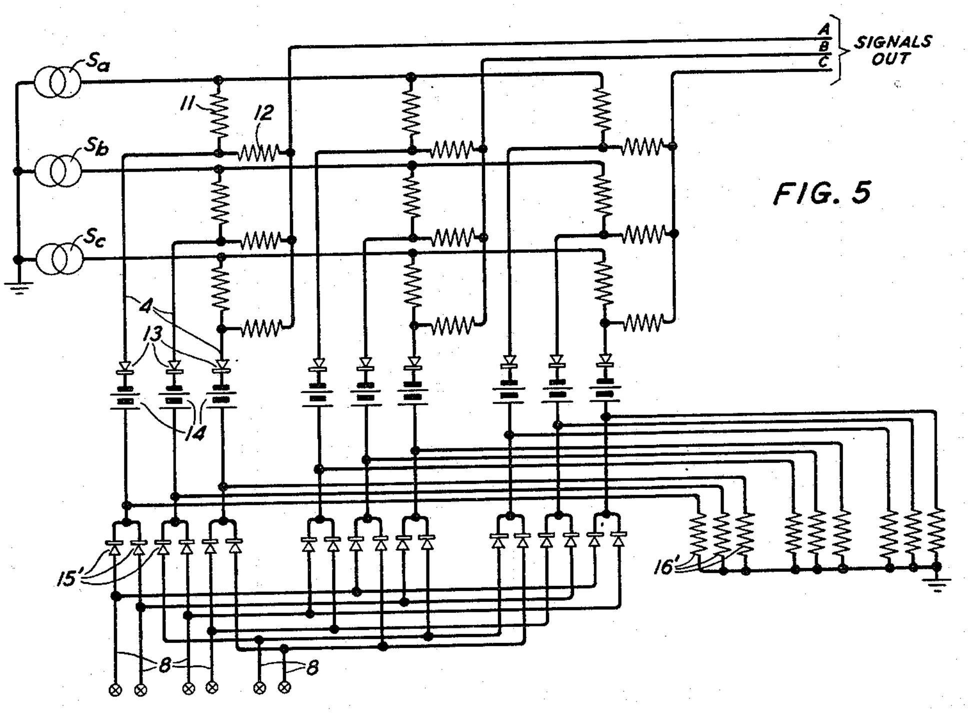
Fig. 5 is a circuit diagram of an alternative to a part of the circuit diagram of Fig. 3.

With respect to any of the actuating leads 8, the associated pair of resistors 15 (Fig. 3) are connected as a voltage divider, so that of a given actuating voltage, only one-half is available for overcoming the bias of the battery 14 and so rendering the rectifier 13 non-conductive. With a system in which N=4, (Fig. 4) six such resistors are connected to each enabling lead rectifier, in which case, the network being, in effect, a voltage divider as before, only one-sixth of the voltage applied to any actuating lead reaches the intended rectifier 13 as an actuating voltage. If such voltage losses are excessive, amplification in accordance with well-known techniques may be employed to compensate for them. If preferred, and at the cost of a slight increase in complexity of the apparatus, the voltage losses may be avoided by the use of rectifiers 15′ to replace the resistors 15 of Fig. 3. Such an arrangement is shown, for N=3, in Fig. 5, in which input and output leads, enabling devices and leads, rectifiers 13, bias batteries 14, and the like, may be the same as those shown in Fig. 3, and the keying circuit, which is omitted from the figure, may be identical with that of Fig. 3. Here the signal currents of the generators S*a*, S*b*, S*c*, in the absence of actuating voltages, are drained off to ground by way of the resistors 11 and 16′. When an actuating voltage is applied to one of the actuating leads 8, of magnitude sufficient to overcome the bias of the battery 14 and the signal voltage, the rectifier 15′ which is connected to the actuating lead becomes conductive while the other rectifiers connected to the same enabling lead remain non-conductive. Therefore, substantially the full value of the voltage applied to the actuating lead 8 appears on the enabling lead 4 and is made available to actuate the desired enabling device. In this way excessive voltage division losses are avoided.

Referring now to Fig. 1, which shows in schematic form a secrecy message transmission system embodying the invention, a conventional telephone transmitter 30 is shown as exemplifying any message signal source. Its output is divided by a splitting network 31 into four channels 32, illustrated as four physically separate conductors, though the separation may equally well be effected on a frequency separation basis, a time division basis, or in any desired manner. Each of the four channels carries a part only of the message signal. The number four is chosen merely for simplicity, and as many separate channels may be employed as may be found desirable.

The four component channels 32 now enter a cross-connection panel 33, which may be omitted if desired, from which they emerge on the four input leads *a*, *b*, *c*, *d* to the permuter. The cross-connection panel 33 permits the four message part channels 32 to be connected in any desired order to the four permuter input leads *a*, *b*, *c*, *d* by means of patching plugs or otherwise. These cross-connections may be changed manually at stated times, such as once a day or once per message, in accordance with a prearranged schedule or program.

The four permuter input leads *a, b, c, d,* are shown as forming a grid with the four output leads A, B, C, D, there being sixteen enabling devices 35, one at each of the cross-points of the grid. An enabling lead 36 furnishes the enabling voltage to each one from a translating device 37 which may be visualized as including the various rectifiers, resistors, bias sources, etc., fully described in connection with Fig. 3, which translate key signals derived from the perforated tapes 38, 39, 40 into the signals required to actuate the enabling devices 35, four at a time.

In a secrecy system it is desirable that the lead permutations be effected, and therefore the key voltages applied, in a highly irregular manner and in as nearly a random order as possible in order to make it difficult for one who does not know the key to reconstruct the message from the permuted signals. A high degree of complexity and arbitrariness, and therefore effective randomness of permutation is obtainable with a keying arrangement employing perforated tapes in the manner shown. The tapes 38, 39, 40 contain, respectively, two, three, and four rows of perforations. They may be driven by a continuously rotating roller 41 in such a way that the various spring contactors 42, which are arranged in register with the rows of perforations, make contact through the perforations with a bed plate 43 which is maintained at a positive potential as by a battery 44. The tapes 38, 39, 40 may be prepared in advance, preferably in an irregular pattern, and they may be used in duplicate, one set at the transmitting station and a like set at the receiving station. The only restriction on the tape punching pattern and the tape drive are that one and only one perforation of each tape shall register with the contactor 42 above it at a time.

Thus the bed plate-tape-spring contactor system serves as a keying system for the permuter, and application of the bed plate potential to the contactors 42 in this manner acts, by virtue of the elements and connections in the translator 37, to place the enabling voltages on the enabling devices 35, four at a time, and only one in each horizontal and in each vertical row. At the instant shown in Fig. 1, voltage of the battery 44 is being applied through a perforation in the tape 38 to the right-hand brush above it. Also, the center brush 42 of the tape 39, and the second brush from the left of tape 40, have voltages applied to them from the same source. Referring to Fig. 4, this configuration of active brushes applies a voltage to the actuating lead indicated by a heavy line and energizes the four enabling devices designated *a*B, *b*C, *c*D, *d*A. By arranging the holes in the tapes in an irregular manner, the application of the key voltage pulses to the contactors 42 may be made to take place in as highly irregular an order as desired. As a result each part of the message signal, appearing on the input leads *a, b, c,* or *d,* is successively switched, in effect, to each of the output leads A, B, C, D, and the twenty-four possible permutations of these signal paths take place in random succession.

The permuted, secret message signal may be transmitted to a receiver station in any desired manner, as by radio or wire line transmission, and any desired type of multiplexing may be employed. For the sake of simplicity of illustration, transmission is indicated as taking place over physically separate lines 45, and all other transmission apparatus and terminal apparatus is omitted from the figure. The received signal, after demodulation, if required, and such amplification as may be necessary, appears on four input conductors 32', and is applied to the four input leads *a', b', c', d'*, of a permuter which may be identical with the transmitter permuter, corresponding elements being designated by like reference characters, distinguished by primes. The tapes 38', 39', 40' may be prepunched in identically the same pattern as the transmitter tapes, and should be driven in exact synchronism with the transmitter tapes.

The internal connections of the receiver apparatus, including the translator 37', may be identical with those of corresponding components at the transmitter, with the proviso that the input signal leads are identifiable with vertical rows of enabling devices 35' and the output signal leads with horizontal rows. This proviso is sufficient to enable the receiver apparatus to reverse each permutation which was made at the transmitter, and so to carry out its deciphering function. For example, referring to Figs. 1 and 4 together, if a given set of tape perforations at the transmitter actuates the enabling devices *a*B, *b*C, *c*D, *d*A, a like set of perforations at the receiver will actuate four enabling devices which are similarly arranged. These, however, are identified at the receiver as *b'*A', *c'*B', *d'*C', *a'*D'. Thus each interconnection, and therefore the whole permutation, will be reversed.

With this proviso the receiver apparatus re-permutes the secret, permuted signal into the same form which characterized it on the input leads *a, b, c, d,* to the transmitter permuter. It remains to reverse the effect of the transmitter cross-connection panel 33. This may be done by the interposition of a similar cross-connection panel 33' at the output terminals of the permuter. After the redistribution of the message signal parts so effected, the signal is of the same form which it had at the output terminals of the message channel splitting apparatus 31. It may then be supplied to channel combining or message synthesizing apparatus 31' which synthesizes the various component message parts into a single, fully intelligible message signal. This may now be reproduced visually, in the form of a record, or audibly, or in any appropriate manner by a reproducing device 50.

The input leads at the transmitter can equally well be identified with vertical rows of enabling devices and the transmitter output leads with horizontal rows; in which case the receiver input leads will be identified with horizontal rows and receiver output leads with vertical rows. Furthermore, the horizontal rows and the vertical rows hereinabove referred to are to be taken as referring only to the arrangement of schematic diagrams. The apparatus as physically constructed may, of course, be given any desired geometrical arrangement or orientation.

Anyone listening in on the system between the sending and receiving stations would be unable to decipher the message being sent, because its component parts are being rapidly and continuously permuted over the output leads in an unintelligible manner. For this reason also it will be impossible for an unauthorized person to control the operation of the receiver correctly because he could not know at any instant what key arrangement is required to effect a given response at the receiver. It is necessary, in order to decipher the message, to have possession of receiver equipment according to Fig. 1 and a set of tapes identical with those in use at the transmitter, to start them at the correct instant and to operate them at the correct speed. It is also necessary to know each cross-connection made in the cross-connection panels 33, 33'.

It is to be understood that the choice of four message leads instead of some other number has been merely by way of example and that the principles disclosed are equally applicable to systems of either greater or less number of message signal channels. Furthermore, modifications of detail, such as the use of different apparatus elements for use with message-modulated high frequency alternating current signals are within the spirit of the invention.

What is claimed is:

1. In combination in an electrical circuit, N separate input leads, N separate output leads crossing said input leads and forming therewith a grid having $N^2$ cross-points, each defined by one input lead and one output lead, enabling means associated with each of said cross-points for establishing a signal path from the input lead to the output lead defining said cross-point, said enabling means comprising a two-terminal impedance element having one terminal connected to the input lead, a two-terminal impedance element having one terminal connected to the output lead, a unidirectionally conducting device connected to the remaining terminals of said impedance elements, said device being normally conductive to constitute normally a discharge path for signal present on the input lead, and means for rendering said device non-conductive to establish a signal path from the input lead to the output lead through said impedance elements in series.

2. In combination in an electric circuit, an input lead, an output lead, and means for establishing a signal path from said input lead to said output lead which comprises a two-terminal impedance element having one terminal connected to said input lead, a two-terminal impedance element having one terminal connected to said output lead, a unidirectionally conducting device connected to the remaining terminals of said impedance elements, said device being normally conductive to provide a discharge path for signal that may be present on said input lead, and means for rendering said device non-conductive whereby a signal path between the input and output leads is established through said impedance elements in series.

3. In a scrambling system for translating input message values into output currents of substantially random occurrence of values, N separate message input circuits, N separate output circuits, each of said input circuits being conductively connected with each of said output circuits, means for normally rendering each of said conductive connections effectively open-circuited, means to apply signals simultaneously to a selected number N of said first-mentioned means for rendering effectively closed-circuited the conductive connections respective to said selected first-mentioned means, and means for permuting on a substantially random basis the first-mentioned means selected.

4. In a signaling system, a plurality N of input conductors, a source of signal individual to each conductor, a plurality N of output conductors, each input conductor being interconnected with each output conductor by a pair of serially-connected impedances, means connected to the common terminal of each of said serially-connected impedances for normally absorbing signal appearing on the respective input conductor, and means connected to said signal absorbing means for successively opposing a different group of N of said signal absorbing means to nullify the signal absorbing function thereof whereby signals present on respective input conductors are transmitted to respective output conductors through the respective interconnecting impedances.

5. In a scrambling system for translating input message values into output current of substantially random occurrence of values, N separate message input circuits, N separate output circuits crossing said input circuits and forming therewith $N^2$ cross-points, an actuating circuit associated with each cross-point, means to select in non-repetitive sequence the N! combinations of said actuating circuits, taken N at a time, corresponding to the N! possible input-output permutations, and means to simultaneously apply actuating signals to the selected actuating circuit.

6. In combination in an electrical circuit, a group of N separate input conductors, a group of N separate output conductors, and means to establish individual signal paths from said input conductors to said output conductors and to permute said paths among themselves in non-repetitive sequence, comprising a group of $N^2$ enabling devices, one associated with each of the intersection points of said input leads with said output leads; means to apply actuating voltages to said individual enabling devices, N at a time, and means for permuting said voltage application to provide the N! possible input-output path permutations in non-repetitive sequence.

7. In a scrambling system for translating input message values into output currents of substantially random occurrence of values, N separate input leads, N separate output leads crossing said input leads and forming therewith a grid having $N^2$ cross-points, each defined by one input lead and one output lead, enabling means associated with each of said cross-points for establishing a signal path from the input lead to the output lead defining said cross-point, said enabling means being arranged in rows associated with said input leads and in other rows associated with said output leads, means for simultaneously actuacting all members of a group consisting of one and only one member of each row, means for selecting N! such groups, and means for actuating said groups successively and in non-repetitive order.

8. In combination, a number $N^2$ of conductors, means for applying voltages of given value to N of said conductors in all possible permutations, and means for applying voltages lower than said given value to the $(N^2-N)$ remaining conductors, which comprises a group of $(N-1)!$ current carrying elements connected to each of said $N^2$ conductors, and a number N! of actuating leads, each actuating lead being connected to a number N of said current carrying elements, distributed among different groups, whereby application of voltage to the various actuating leads singly results in application of voltage of given value to said conductors in correspondingly various groups, N at a time and an application of voltage of less than said given value to the remaining $(N^2-N)$ conductors.

9. The combination defined in claim 8 wherein each of the current carrying elements is an impedance element.

10. The combination defined in claim 8 wherein each of the current carrying elements is a unilaterally conducting device.

11. In an electric circuit translating system, N separate input leads, N separate output leads crossing said input leads and forming therewith a grid having $N^2$ cross-points, each defined by one input lead and one output lead, enabling means requiring a minimum value of enabling voltage associated with each of said cross-points, for establishing a signal path between the input lead and the output lead defining said cross-point, a conductor connected to each of said $N^2$ enabling means, means for applying said minimum enabling voltage to N of said enabling means in N! different ways, means to concurrently apply voltage to the remaining ($N^2-N$) enabling means, and means to limit the voltage applied to said remaining enabling means to a value below said minimum enabling voltage; said voltage applying and limiting means comprising a group of (N−1)! impedance elements connected to each of said $N^2$ conductors, a number N! of actuating leads, each connected to a number N of said impedance elements distributed among different groups, and means for energizing said actuating leads singly and successively in non-repetitive order whereby the N! different permutations of said enabling means, taken N at a time, are actuated in corresponding order while the remaining ($N^2-N$) enabling means are not actuated.

12. A system for interconnecting N input channels with N output channels in all N! possible permutations in non-repetitive sequences, which comprises a coordinate switch network having N input leads each supplied from one input channel and N output leads, crossing said input leads at $N^2$ cross-points and each supplying one output channel, an enabling means associated with each cross-point, a translator having $N^2$ output leads and N! input leads and adapted to actuate said enabling means, N at a time, in response to input control signals applied to its input leads singly, and a keying system having N! output leads, individually connected to the translator input leads, and (N−1) groups of key leads having respectively 2, 3, . . . N key leads, said keying system being adapted to energize the N! translator input leads singly in response to the simultaneous applications of key voltages to one input lead of each group.

13. In combination in an electrical circuit, N separate input leads, N separate output leads crossing said input leads and forming therewith a grid having $N^2$ cross-points, each defined by one input lead and one output lead; enabling means, arranged to be actuated separately and independently of each other, associated with each of said cross-points, for establishing a direct conductive signal path from the input to the output lead defining said cross-point; each of said enabling means comprising a two-terminal impedance element having one terminal connected to the input lead, a two-terminal impedance element having one terminal connected to the output lead, a unidirectionally conducting device connected to the remaining terminals of said impedance elements, a bias source connected with said device, said device being normally conductive to constitute normally a discharge path for signal present on the input lead, and means individual to each device for augmenting said bias source to render said device non-conductive, to establish a signal path from the input lead to the output lead through said impedance elements in series.

14. In combination in an electric circuit, an input lead, an output lead, and means for establishing a signal path from said input lead to said output lead which comprises a two-terminal impedance element having one terminal connected to said input lead, a two-terminal impedance element having one terminal connected to said output lead, a two-terminal unidirectionally conducting device having one terminal connected to the remaining terminals of said impedance elements, said device being normally conductive to provide a discharge path for any signal that may be present on said input lead, and means connected with the other terminal of said device to render said device non-conductive as desired whereby a signal path between the input and output leads is established through said impedance elements in series for any signal present on said input lead.

15. In combination in an electric circuit, an input lead, an output lead, and means for establishing a signal path from said input lead to said output lead which comprises a two-terminal impedance element having one terminal connected to said input lead, a two-terminal impedance element having one terminal connected to said output lead, a unidirectionally conducting device connected to the remaining terminals of said impedance elements, a bias source connected with said device, said device being normally conductive to provide a discharge path for signal that may be present on said input lead, and means for augmenting said bias source to render said device nonconductive whereby a signal path between the input and output leads is established through said impedance elements in series.

16. In a scrambling system for translating input message values into output currents of substantially random occurrence of values, N separate message input circuits, N separate output circuits, each of said input circuits being conductively connected with each of said output circuits, means for normally rendering each of said conductive connections effectively open-circuited, means to apply signals simultaneously to any selected combination of N of said first-mentioned means for rendering effectively closed-circuited the conductive connections respective to said selected first-mentioned means, and means for permuting, on a substantially random basis, the first-mentioned means selected to provide N! combinations.

17. In a signaling system, a plurality N of input conductors, a source of signal individual to each conductor, a plurality N of output conductors, each input conductor being interconnected with each output conductor by a pair of serially-connected impedances, means connected to the common terminal of each of said serially-connected impedances for normally absorbing signal appearing on the respective input conductor, and means independent of said input signal, connected to said signal absorbing means for successively opposing N! different groups of N of said signal absorbing means to nullify the signal absorbing function thereof whereby signals present on respective input conductors are transmitted to respective output conductors through the respective interconnecting impedances in N! different combinations.

18. The invention as claimed in claim 17 in which said serially-connected impedances are resistances, and said signal absorbing means includes a two-element rectifying device.

19. In combination in an electric circuit, an input lead, an output lead, and means for establishing a signal path from said input lead to said output lead which comprises a two-terminal resistor having one terminal connected to said input lead, a two-terminal resistor having one terminal connected to said output lead, a two-terminal unidirectionally conducting device having one termnial connected to the remaining terminals of said resistors, said device being normally conductive to provide a discharge path for any signal that may be present on said input lead, and means connected with the other terminal of said device to render said device non-conductive as desired whereby a signal path between the input and output leads is established through said resistors in series for any signal present on said input lead.

20. In combination in an electric circuit, an input lead, an output lead, and means for establishing a signal path from said input lead to said output lead which comprises a two-terminal resistor having one terminal connected to said input lead, a two-terminal resistor having one terminal connected to said output lead, a two-terminal unidirectionally conducting device connected to the remaining terminals of said resistors, a bias source connected with said device, said device being normally conductive to provide a discharge path for signal that may be present on said input lead, and means for augmenting said bias source to render said device non-conductive whereby a signal path between the input and output leads is established through said resistors in series.

MILTON E. MOHR.

REFERENCES CITED

The following references are of record in the file of this patent:

UNITED STATES PATENTS

| Number | Name | Date |
|---|---|---|
| 2,401,888 | Smith | June 11, 1946 |
| 2,402,059 | Craib | June 11, 1946 |
| 2,424,998 | Nyquist | Aug. 5, 1947 |

FOREIGN PATENTS

| Number | Country | Date |
|---|---|---|
| 109,480 | Australia | Jan. 18, 1940 |